Patented June 13, 1939

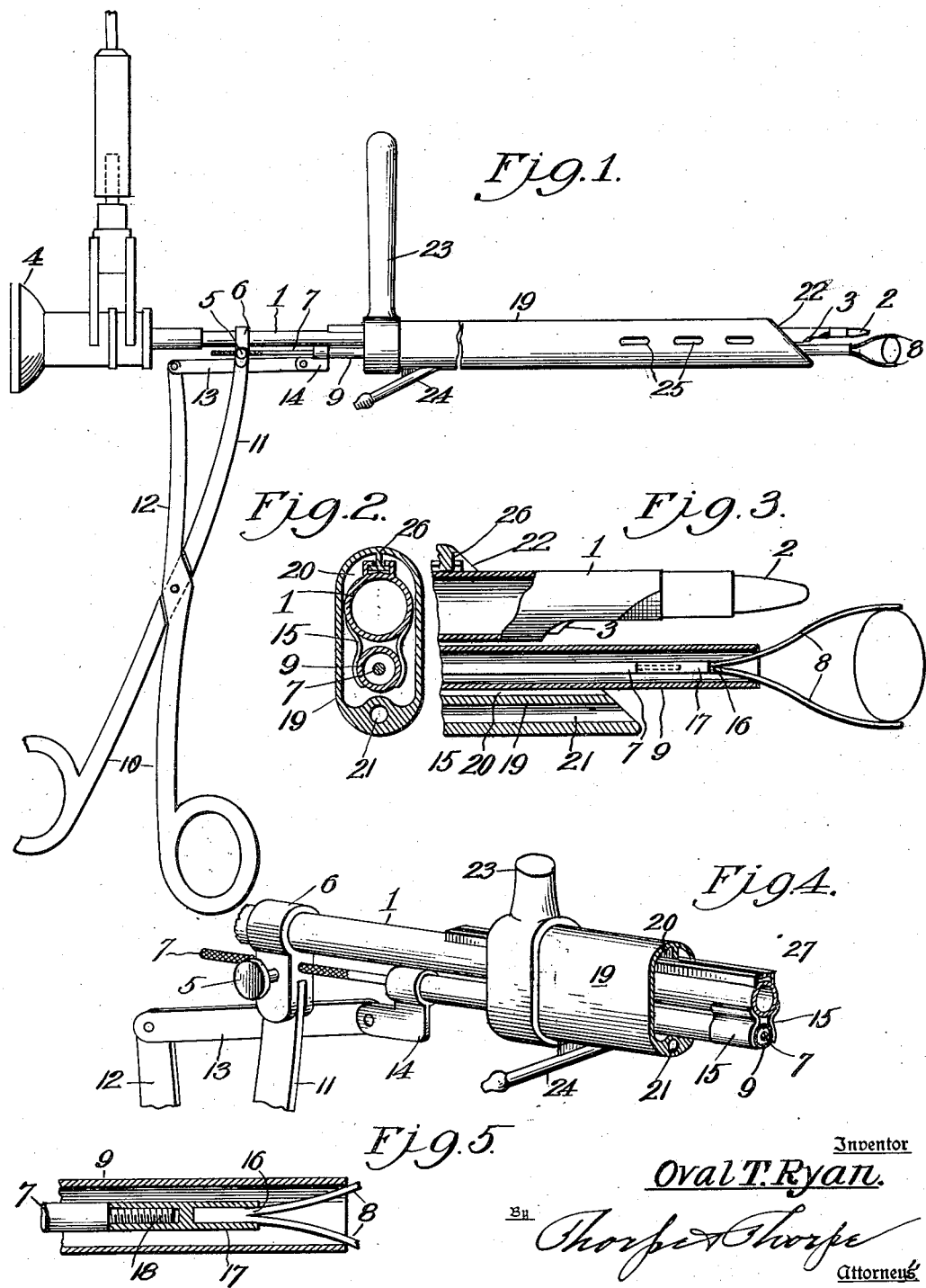

2,162,681

UNITED STATES PATENT OFFICE 2,162,681

BRONCHOSCOPE

Oval T. Ryan, Kansas City, Kans., assignor of one-half to Henry Lange, Conception, Mo.

Application June 13, 1938, Serial No. 213,346

7 Claims. (Cl. 128—6)

This invention primarily relates to bronchoscopes and has for one of its objects to provide means for the withdrawal of foreign bodies from a lung of a patient, the prime object of the invention being to so relate a telescope and a gripping or forceps members that the latter bears a fixed relation to and is in the range of vision of the telescope, even when the forceps are being operated to grip an object so that manipulation of the forceps is always subject to visual examination.

Another object of the invention is to produce a bronchoscope of such nature that the external sheath may be left inserted in the lung of a patient while the telescope and forceps are being withdrawn to remove a fragment of foreign material, and then returned to the sheath in their original position to grip other fragments of such foreign object.

A further object of the invention is to produce a device of the character described, in which the sheath is provided with an evacuation or suction tube for the withdrawal of edemous liquids, so that such liquids will not interfere with the vision and with the manipulation of the forceps.

With the general objects named in view, and others as will hereinafter appear, the invention consists in certain novel and useful features of construction and organization of parts as hereinafter described and claimed; and in order that it may be fully understood, reference is to be had to the accompanying drawing, in which:—

Figure 1 is a side elevation of a bronchoscope involving the invention.

Figure 2 is an enlarged cross section through the same.

Figure 3 is an enlarged longitudinal section through the operating end, or that end of the instrument inserted into a lung.

Figure 4 is an enlarged fragmental perspective view of the bronchoscope and of the scissor-like forceps-operating handles.

Figure 5 is an enlarged section through the forceps to illustrate the detachable relation of the forceps to the carrying rod.

The forceps operating structure, which may be used with any sort of endoscopic tube, comprises a telescope 1 having at one end an electric light 2 so arranged with respect to the lens 3 that an operator by applying his eye to the eyepiece 4, has good vision parallel with the axis of the telescope. The particular telescope illustrated is shown in detail in United States Letters Patent No. 1,680,491, but, of course, it is to be understood that any other suitable telescope may be used.

Extending parallel to the telescope and having its rear end adjustably clamped by means of a clamping bolt 5, to a band 6 forming a part of the telescope, is a long rod 7, which carries at its front end a pair of forceps jaws 8 to grasp foreign particles within a lung or other body cavity. The forceps jaws are of spring metal and normally stand open, and said jaws are brought into desired visual relationship to the lens 3, and are then clamped in position by manipulation of the clamp bolt 5. To close the jaws of the forceps on a foreign object, the rod 7 is encircled by an operating tube 9, which, for convenience, is shown as slightly shorter than the rod 7.

As heretofore stated, as the forceps jaws are fixed in relation to the telescope lens 3, said jaws 8 are adapted to be closed by moving the tube 9 forwardly onto the jaws, rather than by retracting the jaws into the tube. One convenient means of effecting operation of the tube is by scissor-like operating handles 10, having one jaw 11 secured to the telescope band 6, while the other jaw 12 is pivotally secured to one end of a link 13 pivoted at its other end to a band 14 forming a part of the rear end of the operating tube 9. It will be apparent that the operator through manipulation of the position of the telescope with the fingers of one hand grasping the eye-piece 4, can position the forceps 8 over a foreign object, and then by operating the handles 10 (the telescope being held against longitudinal movement), can slide the tube 9 forwardly to close said forceps on the object. To retain the forceps in position and to prevent possible wobbling of the parts, it is preferred that the lower end of the tube 9 shall be slidingly guided between a pair of spring fingers 15 secured to the end of the telescope just above the lens 3, in such a position, however, that there will be no danger of withdrawing the tube from between the guide fingers during the operation of the device.

In practice it may be found desirable to make the forceps 8 in different sizes and shapes and have them detachable from the rod 7. One means of accomplishing this object is to secure the stem 16 of the forceps within a sleeve 17 having a threaded socket at its other end. The front end of the rod 7 may be reduced and threaded as at 18 for engagement with said threaded socket.

It will be evident from the above that the telescope and forceps assembly may be used with any type of endoscopic or bronchoscopic sheath 19, but in the preferred construction, the sheath is provided with a pair of parallel passages 20 and 21. The end of the sheath is preferably cut off angularly as at 22, said end bearing such relation to the operating or placing handle 23, that the passage 21 has its open end coextensive with the long side of the sheath and is thus in the lowest part of the lung when the bronchoscope is in operative position. The end of the passage 21 has an extension 24 through the wall of the sheath 19, to which a vacuum pump may be attached. The passage 20 may be called the working and breathing passage, as said passage is formed with air openings 25 through its side wall, and is the passage or bore through which the telescope, forceps, etc., are manipulated.

The air passage 20 of the sheath 19 is preferably provided with a longitudinally extending track or guide, such as an internal T-shaped rib 26. The wall of the telescope opposite its spring fingers 15 is provided with annular flanged guides 27 engaging and complementary to the rib 26, so that the telescope is slidably but non-rotatably secured within the sheath and may be removed and replaced in position within a lung should it be necessary, as heretofore indicated, to remove shattered fragments of a foreign body.

From the above description, it will be apparent that while I have described and illustrated a device possessing all the features of advantage set forth as desirable, it is to be understood that I reserve the right to make all changes within the spirit of the invention and without the ambit of the prior art.

I claim:

1. In an instrument of the character described, the combination of a sheath, a telescope extending through said sheath, a tube slidably carried by the telescope, a forceps-operating rod secured at one end to the telescope and extending through said tube, and means interlocking the telescope and sheath against independent rotation but permitting relative longitudinal sliding movement thereof.

2. In an instrument of the character described, the combination of a sheath, a telescope extending through said sheath, a tube slidably carried by the telescope, a forceps-operating rod extending through said tube and in fixed relation to the telescope, and a double-jawed operating member having one jaw secured to the telescope and the other jaw to said tube.

3. In an instrument of the character described, the combination of a telescope, of a tube slidably related to said telescope, a rod extending through said tube and interlocked at one end with the telescope, forceps carried by one end of said rod and adapted to be closed by movement tending to retract them into the tube, and a double-jawed operating member having one jaw secured to the telescope and the other jaw secured to the tube.

4. In an instrument of the character described, the combination of a telescope, a forceps-operating rod secured at one end to said telescope, forceps carried by one end of said rod, means to adjust the rod to position the forceps in relation to the telescope, a forceps closing tube encircling the forceps rod, and means to slide said tube to close the forceps.

5. In an instrument of the character described, the combination of a telescope, a forceps-operating rod secured at one end to said telescope, forceps carried by one end of said rod, means to adjust the rod to position the forceps in relation to the telescope, a forceps-closing tube encircling the forceps rod, and an operating member for the forceps having a pair of jaws reacting respectively on the tube and on the telescope.

6. In an instrument of the character described, the combination of a sheath, a telescope extending through said sheath, means interlocking the telescope and sheath for relative longitudinal but non-rotatable adjustment, a tube slidably carried by the telescope, a forceps-carrying rod extending through said tube and in fixed relation to the telescope, forceps carried by said rod in the range of telescope vision, and means connected to the telescope and tube for effecting longitudinal movement of the tube to close said forceps.

7. In an instrument of the character described, the combination of a sheath having a pair of passageways, one of said passageways constituting an evacuating passageway and the other a breathing passageway, a telescope slidably extending through the breathing passageway, a forceps-carrying rod adjustably fixed to the telescope at one end, forceps carried by the other end of said rod in the range of vision of the telescope, a forceps-closing tube slidably encircling said rod, a forceps operating member having a pair of jaws respectively secured to the telescope and the closing tube, and means interlocking the telescope and sheath against independent rotation but permitting relative longitudinal movement.

OVAL T. RYAN.